July 30, 1968     I. S. HOUVENER     3,394,433
APPARATUS FOR EXTRUDING PLASTIC TUBES WITH
CROSS-RIBBED SURFACES
Original Filed Sept. 27, 1961     2 Sheets-Sheet 1
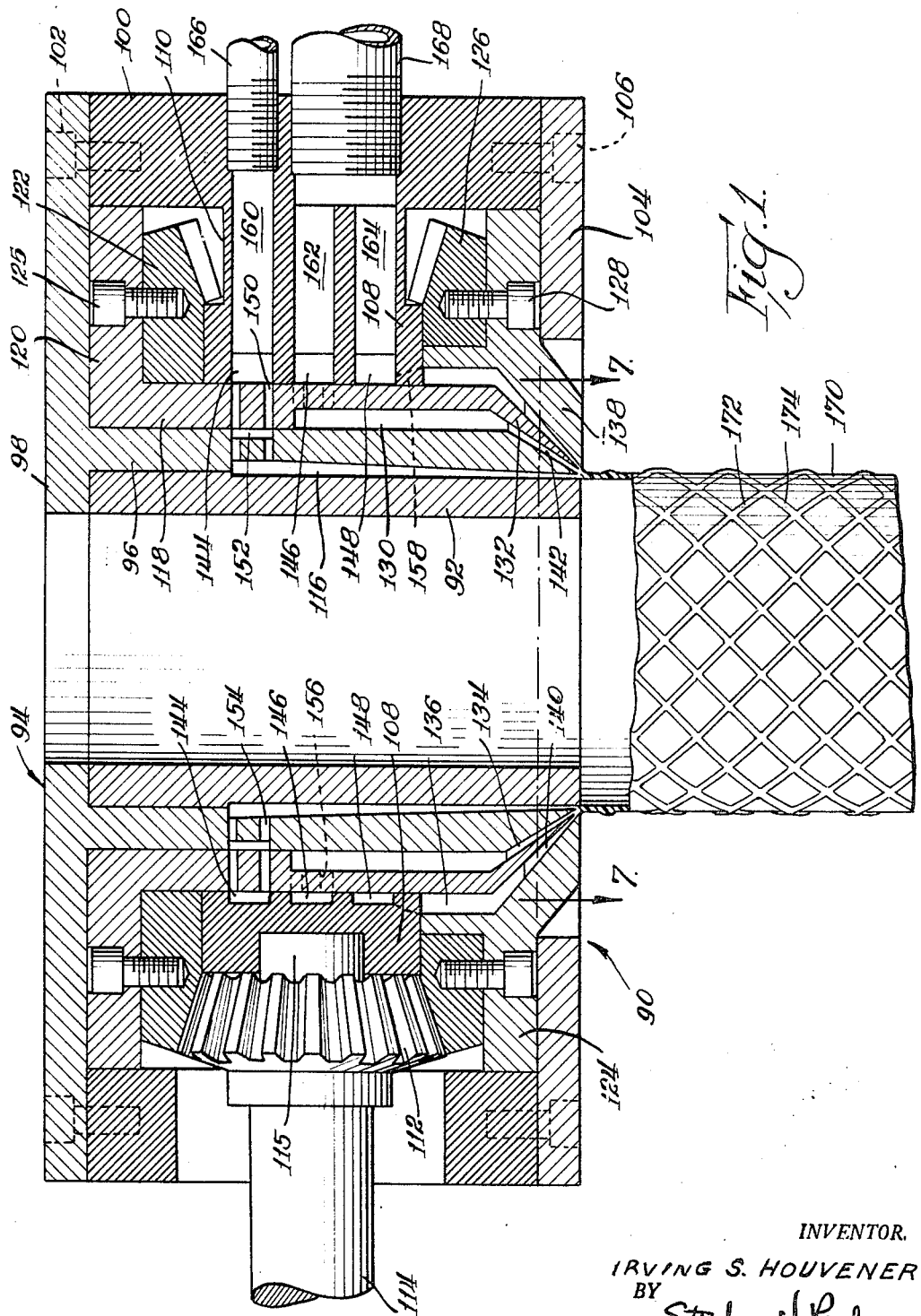
INVENTOR.
IRVING S. HOUVENER

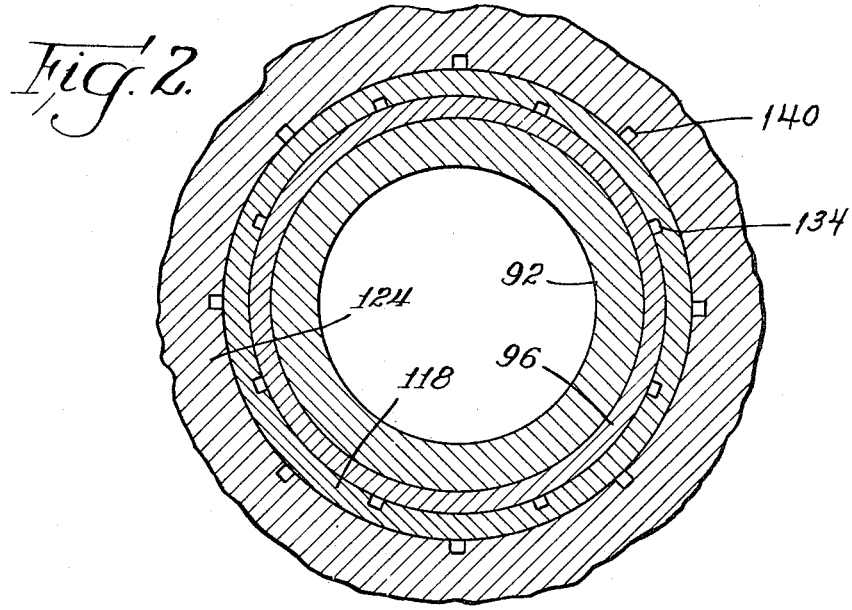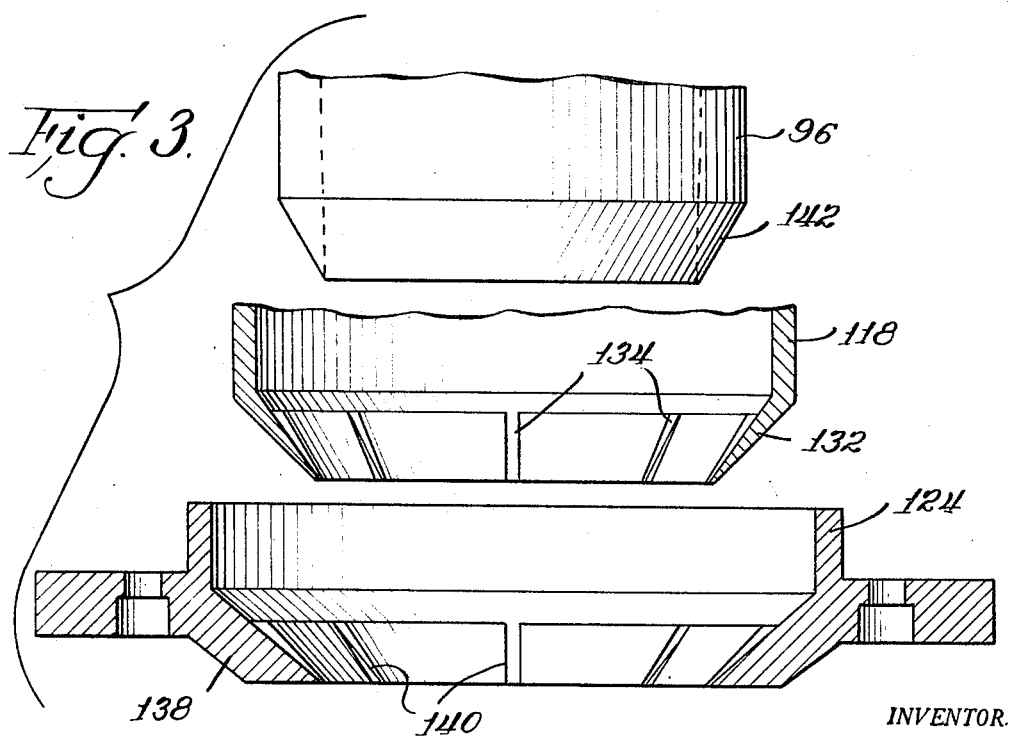

United States Patent Office 3,394,433
Patented July 30, 1968

3,394,433
APPARATUS FOR EXTRUDING PLASTIC TUBES WITH CROSS-RIBBED SURFACES
Irving S. Houvener, Midland, Mich., assignor to The Dow Chemical Company, Midland, Mich., a corporation of Delaware
Continuation of application Ser. No. 141,163, Sept. 27, 1961. This application Mar. 16, 1964, Ser. No. 353,314
14 Claims. (Cl. 18—14)

ABSTRACT OF THE DISCLOSURE

Plastic tubes with cross-ribbed surfaces are made by simultaneously extruding a tube and cross-ribbing through rotating nozzle pieces arranged concentrically.

This application is a continuation application of copending application Ser. No. 141,163, filed Sept. 27, 1961 and now abandoned.

This invention relates to an apparatus adapted for fabrication of tubular webbing, which, if desired, may be formed on the exterior surface of a tubular film, to enhance its appearance and strength.

While any material which is extrudable may be used in practicing the invention, plastic materials such as normally solid polyolefins, particularly polyethylene, polypropylene, copolymers of ethylene and propylene and the like, polystyrene and nylon, may be most advantageously utilized.

The type of product under consideration is relatively new in the art of plastic extrusion. For example, reference may be made to U.S. Patent 2,919,467 issued Jan. 5, 1960, to F. B. Mercer, which discloses a method and apparatus for fabrication of plastic net-like structures. While the teachings of the Mercer patent and those of the present disclosure, have certain objectives in common, the method, apparatus and product disclosed herein differ significantly from that of the Mercer patent. Considering the product, that produced by the apparatus of Mercer is obtained in effect, by longitudinally splitting or shearing extruded strands of material as they move from an extrusion nozzle. Predetermined lengths of each strand are left unsplit whereby adjoining strands will be interconnected in a manner as to form a net-like structure.

In the product produced by the apparatus of the present invention, the strands making up the web-like structure are extruded with a uniform thickness diameter and in a predesignated manner to achieve a web-like product. Irrespective of the relative merits of the comparative products under consideration, the principles of the present invention provide greater flexibility in product, for among other things, either tubular webbing or tubular film having a web-like exterior, may be extruded in a continuous operation. The apparatus of the present invention may likewise be used to achieve a great variety of web patterns, as with the apparatus of the Mercer patent.

An object of this invention is to provide apparatus for producing webbing in a continuous extrusion operation.

Another object of the invention is to provide apparatus for producing plastic webbing in a continuous extrusion operation wherein the pattern of the webbing may be varied.

Still another object of the invention is to provide apparatus for producing a plastic tubular product in either webbing form, or as a solid film having an integrally formed webbing exterior surface.

These and further objects and features of the invention will become more apparent from the following description and accompanying drawings wherein:

FIG. 1 is an elevation view in cross section of another embodiment of extruder apparatus embodying the principles of the invention;

FIG. 2 is a section view generally as seen along line 7—7 in FIG. 1; and

FIG. 3 is an exploded view of certain components forming a rib forming nozzle assembly used in the apparatus of FIG. 1.

Referring now to the drawing, the extruder head assembly 90 includes a cylindrical inner tube forming nozzle 92, which is secured to a composite piece 94 comprising an outer tube forming nozzle 96, and a bearing cap 98. A generally cylindrical body member 100 is secured at one end to the bearing cap 98 by fastening means, such as cap screws 102. A bearing cap 104 is secured to the other end of the body member 100 by fastening means, such as cap screws 106. The body member 100 has a concentrically arranged cylindrical portion 108 supported by a web 110 which extends the full circumference of the body member except for a portion which provides clearance for a bevel gear 112, mounted upon the end of a drive shaft 114. An outboard bearing 115 is provided in the cylindrical portion 108 for the gear 112.

Portions of the outer wall of the inner tube forming nozzle 92 as well as the inner wall of the outer tube forming nozzle 96 are recessed to provide a material conduit 116 extending about the entire circumference of the nozzle and tapering in the direction of the bearing cap 104.

An inner rib nozzle piece 118, generally cylindrical in form and having a flange 120 at one end, is mounted for sliding engagement relative to various components including the composite piece 94, the end surface of the cylindrical portion 108, as well as the inner surface of the body member 100. A ring gear 122, affixed to the flange 120 by fastening means, such as cap screws 125, is arranged for driven engagement by the bevel gear 112.

An outer rib nozzle piece 124, which is generally cylindrical in form, is mounted for sliding engagement relative to various components including the bearing cap 104, a surface of the cylindrical portion 108, as well as the inner surface of the body member 100. A ring gear 126, affixed to the nozzle piece 124 by fastening means such as cap screws 128, is arranged for driven engagement by the bevel gear 112.

An inner rib forming material conduit 130 is provided on an inner portion of nozzle piece 118 and extends about the entire circumference thereof. The lower end of the nozzle piece 118 has a conical inwardly tapering portion 132, the inner surface having a plurality of radially arranged inner rib-forming grooves 134, the upper ends of which open into the material conduit 130. An outer rib forming material conduit 136 is provided on an inner portion of the nozzle piece 124 and extends about the entire circumference thereof. The lower end of the nozzle piece 124 has a conical inwardly tapering portion 138, the inner surface having a plurality of radially arranged outer rib forming grooves 140, the upper ends of which open into the material conduit 136. It will be noted that the inner surface of the tapering portion 132 is in sliding engagement with a conical tapered surface 142 provided on the lower end of the nozzle 96, while the inner surface of the tapering portion 138 is in sliding engagement with the exterior surface of the conical tapering portion 132. The lower extremities of the tapering portions 132 and 138, as well as the nozzle end 142, terminate in substantially the same plane so that material being extruded from the material conduits 116, 130 and 136 will emerge generally simultaneously from the extruder head assembly 90.

Gate means in the form of a circumferential groove 144, 146 and 148, are provided in the cylindrical portion 108. Gate 114 is in communication with supply conduit 116 via a plurality of radially arranged flow control channels 150, formed in the nozzle piece 118, a circumferentially arranged transfer groove 152, and a plurality of radially arranged flow control channels 154. The groove 152 and channels 154 are formed in the nozzle 96. Gate 146 is in communication with material conduit 130 via a plurality of radially arranged flow control channels 156 formed in the nozzle piece 118. Gate 148 is in communication with material conduit 136 via flow control channels 158 formed in the cylindrical portion 108. Attention is directed to the fact that the gates 144, 146, and 148 have an eccentric configuration, so that the depth tapers to a point of minimum dimension. In such manner, a pressure distributing means is provided for plastic material forced into the gate so that it will flow evenly during an extrusion operation.

Material is fed to the gates 144, 146 and 148 by conduit, or passageways 160, 162, and 164, respectively, all of which are formed in the cylindrical portion 108 and web 110. The conduits 160, 162 and 164, are adapted for connection to pipe means leading from a source(s) of pressurized material to be extruded by the head assembly 90. While the conduits may variously be arranged relative to the exterior pipe means, conduit 160 is shown being served by a pipe 166, while conduits 162 and 164 are shown as being served by a pipe 168. Such variation in conduit connection possibilities provides for extrusion of a tubular film 170 with exterior ribs 172 and 174, all being of the same material, or with different combinations of material. For example, the material used for extruding the tubular film 170 may be a plastic of a given color, while the material used for extruding the exterior ribs 162 and 174 may be fiber reinforced and of different color.

The operation of the extruder head assembly 90 should be apparent, however, briefly it is as follows. Plastic material is forced under pressure from the lower ends thereof. The material emerging from the conduit 116 will form a solid tubular film 170, while that emerging from the material conduits 130 and 136 will form a helical crisscross pattern of ribs 172 and 174 on the exterior wall of film 170. The pattern of the ribs 172 and 174 will depend upon various factors including the number of grooves 134 and 140, the relative speed of rotation between the nozzle pieces 118 and 124, and the material extrusion rate. Although the gearing arrangement shown will give a uniform helical rib pattern, individual drives may be arranged for the ring gears to provide varied patterns when the ring gears are rotated in controlled directions.

It may be desirable to provide pressurized gaseous medium or cooling fluids to the inside of the tubular film 170 as it is being extruded. Toward this end, such medium may be introduced through the tube forming nozzle 92. Attention is directed to the fact the web-like tubular forms, i.e., ribs 172 and 174, may be extruded independent of a solid tubular film, i.e., 170, by either eliminating the material conduit 116, or by shutting off supply of plastic material thereto.

From the foregoing it will be realized that either of the two disclosed embodiments will satisfy the objectives of the invention set forth hereinbefore.

The foregoing description has been given in detail without thought of limitation since the inventive principles involved are capable of assuming other forms without departing from the spirit of the invention or the scope of the following claims.

What is claimed is:

1. A method of fabricating a plastic tubular film having a cross ribbed surface comprising the steps of, simultaneously extruding a plurality of ribbons of plastic material axially from equally spaced points along concentrically arranged circles, causing rotational movement between the ribbons of one circle relative to the ribbons of the other circle, allowing the ribbons of one circle to unite with the ribbons of the other circle at each point of intersection thereof to form a tubular webbing, forming a tube of plastic material concentric with said tubular webbing, and causing the tubular webbing to intimately adhere to the tube of plastic material as the latter is being formed.

2. Apparatus for continuously extruding plastic tubular film having a cross ribbed surface including, a circular inner tube forming nozzle, a circular outer tube forming nozzle, said outer tube forming nozzle surrounding the inner tube forming nozzle, a circular inner rib nozzle piece surrounding the outer tube forming nozzle, a circular outer rib nozzle piece surrounding the inner rib nozzle piece, said inner tube forming nozzle and said outer tube forming nozzle being arranged to provide a material conduit which opens at the lower end, said inner rib nozzle piece being formed with rib forming grooves on its inner wall which grooves open at their lower end, said outer rib nozzle piece being formed with rib forming grooves on its inner wall which grooves open at their lower end, said material conduit opening and said groove openings being arranged generally in the same horizontal plane, means to provide relative rotary movement between the inner rib nozzle piece and the outer rib nozzle piece, and means for conduction of plastic material to said material conduit and said grooves.

3. Apparatus for continuously extruding plastic tubular film having a cross ribbed surface including, a circular inner tube forming nozzle, a composite piece having a circular outer tube forming nozzle and an upper bearing cap, said outer tube forming nozzle surrounding the inner tube forming nozzle, a circular inner rib nozzle piece surrounding the outer tube forming nozzle, a circular outer rib nozzle piece surrounding the inner rib nozzle piece, said inner tube forming nozzle and said outer tube forming nozzle being arranged to provide a material conduit therebetween which opens at the lower end, said inner rib nozzle piece being formed to provide a material conduit on its inner wall which opens at the lower end, said outer rib nozzle piece being formed to provide a material conduit on its inner wall which opens at its lower end, said material conduit openings being arranged generally in the same horizontal plane, a cylindrical body member affixed to said upper bearing cap and surrounding the inner rib forming nozzle and the outer rib forming nozzle, a lower bearing cap affixed to the cylindrical body member, a ring gear connected to the inner rib forming nozzle, a bevel gear arranged in driving relationship with both ring gears, and conduction means for conduction of plastic material to said material conduits.

4. Apparatus according to claim 3 wherein the lower part of the material opening between the outer film forming nozzle and the inner rib forming nozzle, as well as the lower part of the material opening between the inner rib forming nozzle and the outer rib forming nozzle are tapered inwardly toward the inner tube forming nozzle.

5. Apparatus according to claim 3 wherein the cylindrical body member is formed to include a plurality of gates and passageways forming part of said conduction means.

6. Apparatus according to claim 3 wherein the tapered parts of the inner rib forming nozzle and the outer rib forming nozzle are formed to provide radially directed grooves.

7. A method for fabricating tubular webbing comprising the steps of simultaneously extruding a plurality of ribbons of raw material in fluid form axially from equally spaced points along concentrically arranged circles, causing rotational movement between the ribbons of one circle relative to the ribbons of the outer circle, and allowing the ribbons of one circle to unite with the ribbons of the other circle at each point of intersection thereof to form a tubular webbing.

8. A method for fabricating tubular webbing comprising the steps of feeding raw material in fluid form to separate passage means, simultaneously extruding a plurality of ribbons of such material from each passage means axially from equally spaced points along concentrically arranged circles, causing rotational movement between the ribbons of one circle relative to the ribbons of the other circle, and allowing the ribbons of one circle to unite with the ribbons of the other circle at each point of intersection thereof to form a tubular webbing.

9. A method of fabricating a plastic tubular film having a cross-ribbed surface comprising the steps of feeding a raw material in fluid form into separate passage means, simultaneously extruding a plurality of ribbons of such material from each passage means axially from equally spaced points along concentrically arranged circles, causing rotational movement between the ribbons of one circle relative to the ribbons of the other circle, allowing the ribbons of one circle to unite with the ribbons of the other circle at each point of intersection thereof to form a tubular webbing, forming a tube of plastic material concentric with said tubular webbing and causing the tubular webbing to intimately adhere to the tube of plastic material as the latter is being formed.

10. Apparatus for extruding tubular webbing comprising a tubular nozzle piece, a circular inner ribbed nozzle piece with rib forming grooves therein surrounding said tubular nozzle piece, a circular outer ribbed nozzle piece with rib forming grooves therein surrounding said inner ribbed nozzle piece, said tubular nozzle piece, and said grooves of said inner ribbed nozzle piece and said outer ribbed nozzle piece being arranged to provide material conduits which open at the lower end, said material conduit openings being arranged generally in the same horizontal plane, means to provide relative rotary movement between the inner ribbed nozzle piece and the outer ribbed nozzle piece and means for conduction of raw material in fluid form to said material conduits.

11. Apparatus for extruding tubular webbing comprigging a tubular nozzle piece, a circular inner ribbed nozzle piece surrounding said tubular nozzle piece, a circular outer ribbed nozzle piece surrounding said inner ribbed nozzle piece, said tubular nozzle piece, said inner ribbed nozzle piece and said outer ribbed nozzle piece being arranged to provide material conduits which open at the lower end, said material conduit openings being arranged generally in the same horizontal plane, said inner ribbed nozzle piece and said outer ribbed nozzle piece each having a plurality of radially arranged rib-forming grooves at said material conduit opening, means to provide relative rotary movement between the inner rib nozzle piece and the outer ribbed nozzle piece, and means for conduction of raw material in fluid form to said material conduits.

12. A tube of solid polyolefin film with an integrally formed webbing exterior surface, parallel strands of said webbing exterior surface having a different physical characteristic than the parallel strands which are angular thereto.

13. A tube of solid polyolefin film with an integrally formed webbing exterior surface, parallel strands of said webbing exterior surface having a different color characteristic than the parallel strands which are angular thereto.

14. A tube of solid polyolefin film of one color with an integrally formed webbing exterior surface, the parallel strands of said webbing exterior surface having a second color and the parallel strands which are angular thereto having a third color.

References Cited
UNITED STATES PATENTS

| | | |
|---|---|---|
| 3,082,484 | 3/1963 | Sherman. |
| 3,184,358 | 5/1965 | Utz. |
| 3,193,604 | 7/1965 | Mercer _____ 264—95 |

WILLIAM J. STEPHENSON, *Primary Examiner.*

UNITED STATES PATENT OFFICE
CERTIFICATE OF CORRECTION

Patent No. 3,394,433                    July 30, 1968

Irving S. Houvener

It is certified that error appears in the above identified patent and that said Letters Patent are hereby corrected as shown below:

Column 2, line 8, "drawing" should read -- drawings --. Column 3, line 36, after "from" insert -- a source via pipes 166 and 168 into the gates 144,146 and 148. It then move downwardly in the material conduits 116, 130 and 136, where it is extruded from --; lines 58, 59 and 60, cancel "From the foregoing it will be realized that either of the two disclosed embodiments will satisfy the objectives of the invention set forth hereinbefore.".

Signed and sealed this 2nd day of December 1969.

(SEAL)

Attest:

Edward M. Fletcher, Jr.

Attesting Officer

WILLIAM E. SCHUYLER, JR.

Commissioner of Patents